(12) United States Patent
Nishino et al.

(10) Patent No.: US 11,186,068 B2
(45) Date of Patent: Nov. 30, 2021

(54) INTERLAYER FOR LAMINATED GLASS, ROLL BODY, AND LAMINATED GLASS

(71) Applicant: SEKISUI CHEMICAL CO., LTD., Osaka (JP)

(72) Inventors: Hiromitsu Nishino, Kouka (JP); Etsurou Hirota, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/775,801

(22) PCT Filed: Dec. 13, 2016

(86) PCT No.: PCT/JP2016/086984
§ 371 (c)(1),
(2) Date: May 11, 2018

(87) PCT Pub. No.: WO2017/104632
PCT Pub. Date: Jun. 22, 2017

(65) Prior Publication Data
US 2018/0319130 A1 Nov. 8, 2018

(30) Foreign Application Priority Data
Dec. 18, 2015 (JP) .............................. JP2015-247428

(51) Int. Cl.
*B32B 17/10* (2006.01)
*B60J 1/02* (2006.01)
(Continued)

(52) U.S. Cl.
CPC .. *B32B 17/10036* (2013.01); *B32B 17/10568* (2013.01); *B32B 17/10761* (2013.01);
(Continued)

(58) Field of Classification Search
CPC .. B32B 3/26; B32B 3/263; B32B 3/30; B32B 17/06; B32B 17/064; B32B 17/10;
(Continued)

(56) References Cited

U.S. PATENT DOCUMENTS

| 4,943,140 A | 7/1990 | Woodard et al. |
| 7,419,716 B2 * | 9/2008 | Tian ...................... E04F 13/002 |
| | | 428/156 |

(Continued)

FOREIGN PATENT DOCUMENTS

| CN | 103080037 A | 5/2013 |
| CN | 103097320 A | 5/2013 |

(Continued)

OTHER PUBLICATIONS

Written Opinion of the International Searching Authority (PCT/ISA/237) for Application No. PCT/JP2016/086984 dated Feb. 7, 2017 (English Translation mailed Jun. 28, 2018).

(Continued)

*Primary Examiner* — Megha M Gaitonde
(74) *Attorney, Agent, or Firm* — Cheng Law Group, PLLC

(57) ABSTRACT

There is provided an interlayer film for laminated glass capable of being enhanced in handling properties at the time of preparing laminated glass. The interlayer film for laminated glass according to the present invention has one end and the other end being at the opposite side of the one end, the thickness of the other end is larger than the thickness of the one end, and the glossiness on the surface of a maximum thickness part is 3% or more.

19 Claims, 4 Drawing Sheets

(51) Int. Cl.
  *B60J 1/00*  (2006.01)
  *B32B 27/30* (2006.01)
  *B32B 27/08* (2006.01)
  *B32B 27/22* (2006.01)

(52) U.S. Cl.
  CPC .............. *B32B 27/08* (2013.01); *B32B 27/30* (2013.01); *B32B 27/306* (2013.01); *B60J 1/00* (2013.01); *B60J 1/02* (2013.01); *B32B 27/22* (2013.01); *B32B 2250/03* (2013.01); *B32B 2315/08* (2013.01); *B32B 2605/006* (2013.01); *B32B 2605/08* (2013.01)

(58) Field of Classification Search
  CPC .......... B32B 17/10165; B32B 17/1055; B32B 17/10559; B32B 17/10761; B32B 17/10568; B32B 17/10577; B32B 17/10587; B32B 27/06; B32B 27/30; B32B 27/306; Y10T 428/24058; Y10T 428/24355; Y10T 428/24364; Y10T 428/24405; Y10T 428/24479; Y10T 428/24504; Y10T 428/24521; Y10T 428/24529; Y10T 428/24537; Y10T 428/2457; Y10T 428/24612; Y10T 428/2462; Y10T 428/24942; Y10T 428/2495; Y10T 428/24959
  USPC ....... 428/105, 112, 141, 142, 147, 156, 159, 428/161, 162, 163, 167, 172, 173, 212, 428/213, 214
  See application file for complete search history.

(56) References Cited

U.S. PATENT DOCUMENTS

| | | |
|---|---|---|
| 2004/0053006 A1 | 3/2004 | Omizu et al. |
| 2007/0009714 A1* | 1/2007 | Lee .................... B32B 2367/00 428/172 |
| 2009/0002390 A1 | 9/2009 | Ishioka |
| 2009/0239017 A1* | 9/2009 | Ishioka ............. B32B 17/10036 428/38 |
| 2009/0294212 A1 | 12/2009 | Miyai |
| 2010/0043946 A1 | 2/2010 | Ogino et al. |
| 2011/0094825 A1 | 4/2011 | Miyai |
| 2012/0003428 A1 | 1/2012 | Miyai |
| 2012/0228796 A1 | 9/2012 | Ogino et al. |
| 2012/0258307 A1 | 10/2012 | Cretekos et al. |
| 2013/0149503 A1 | 6/2013 | Yamamoto et al. |
| 2013/0194659 A1 | 8/2013 | Hatta et al. |
| 2014/0016244 A1 | 1/2014 | Monno et al. |
| 2014/0178651 A1 | 6/2014 | Miyai |
| 2015/0258747 A1 | 9/2015 | Miyai |
| 2016/0318278 A1 | 11/2016 | Nakayama et al. |
| 2016/0341960 A1 | 11/2016 | Miyai |
| 2017/0008257 A1 | 1/2017 | Nakayama et al. |
| 2017/0129220 A1* | 5/2017 | Taka ...................... B32B 23/20 |
| 2018/0050519 A1 | 2/2018 | Nakayama et al. |
| 2018/0319130 A1 | 11/2018 | Nishino et al. |

FOREIGN PATENT DOCUMENTS

| | | | |
|---|---|---|---|
| CN | 103429416 A | 12/2013 | |
| EP | 2 674 295 A1 | 12/2013 | |
| EP | 3 281 925 A1 | 2/2018 | |
| JP | 4-502525 A | 5/1992 | |
| JP | 7-292133 A | 11/1995 | |
| JP | 2000-290046 A | 10/2000 | |
| JP | 2005-68006 A | 3/2005 | |
| JP | 2012-106932 A | 6/2012 | |
| JP | 2013-1613 A | 1/2013 | |
| JP | 6152496 B1 | 6/2017 | |
| KR | 10-2009-0010952 A | 1/2009 | |
| KR | 10-2010-0023002 A | 3/2010 | |
| WO | WO-91/06031 A1 | 5/1991 | |
| WO | WO-2008/069186 A1 | 6/2008 | |
| WO | WO-2015/152241 A1 | 10/2015 | |
| WO | WO-2015/156364 A1 | 10/2015 | |
| WO | WO-2015/156365 A1 | 10/2015 | |
| WO | WO-2015182639 A1 * | 12/2015 | ............. B32B 23/20 |
| WO | WO-2016/163512 A1 | 10/2016 | |

OTHER PUBLICATIONS

International Search Report for Application No. PCT/JP2016/086984 dated Feb. 7, 2017.
Supplementary European Search Report for the Application No. EP 16 875 609.6 dated Jul. 19, 2019.
European Office Action for the Application No. 16 875 609.6 dated Mar. 30, 2020.

* cited by examiner

[FIG. 1]
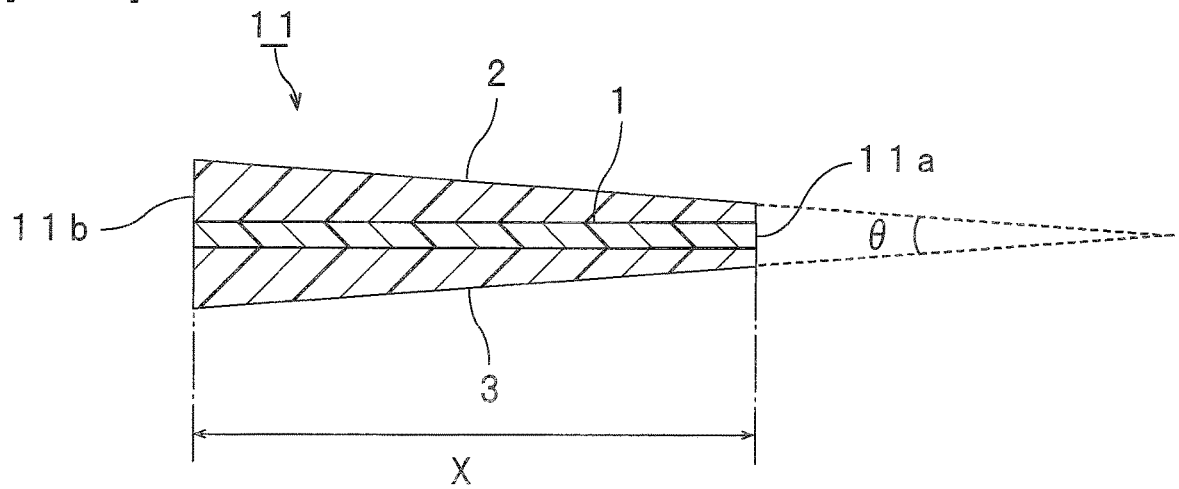
[FIG. 2]
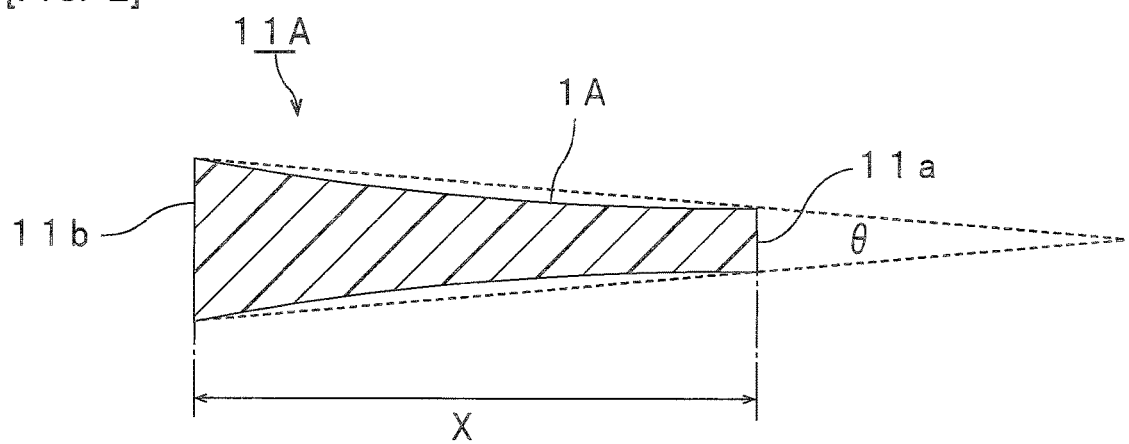
[FIG. 3]
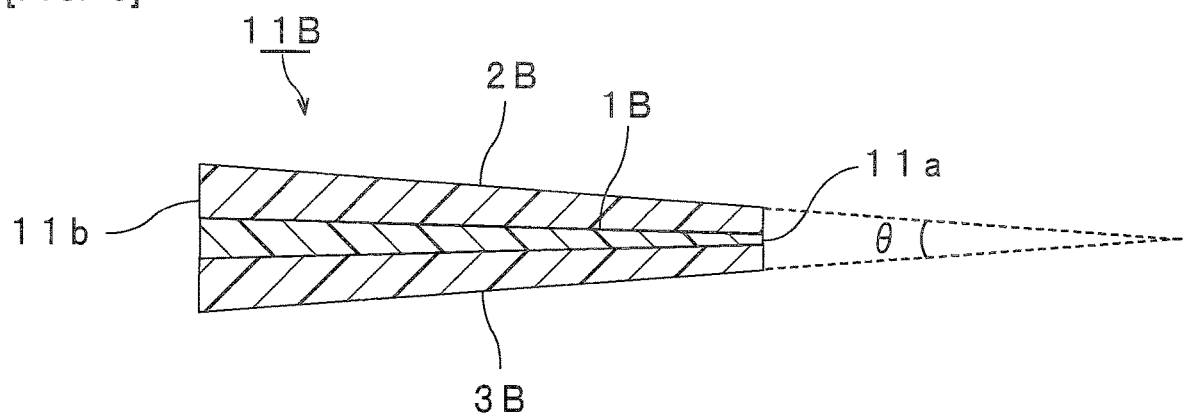

[FIG. 4]
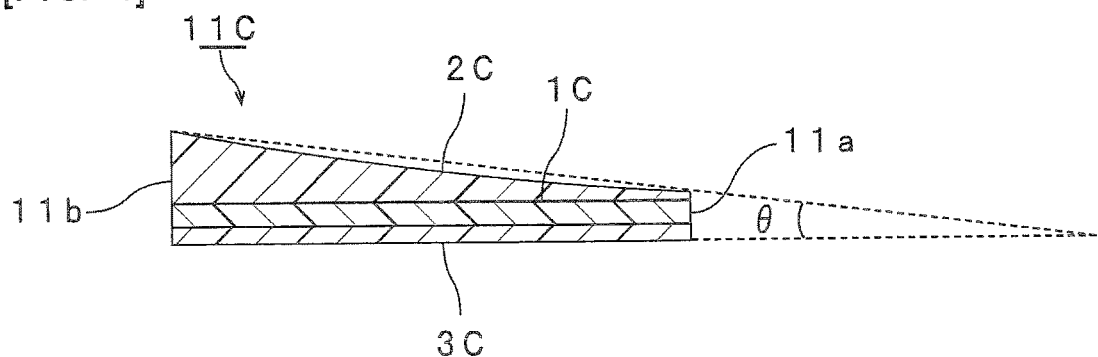
[FIG. 5]
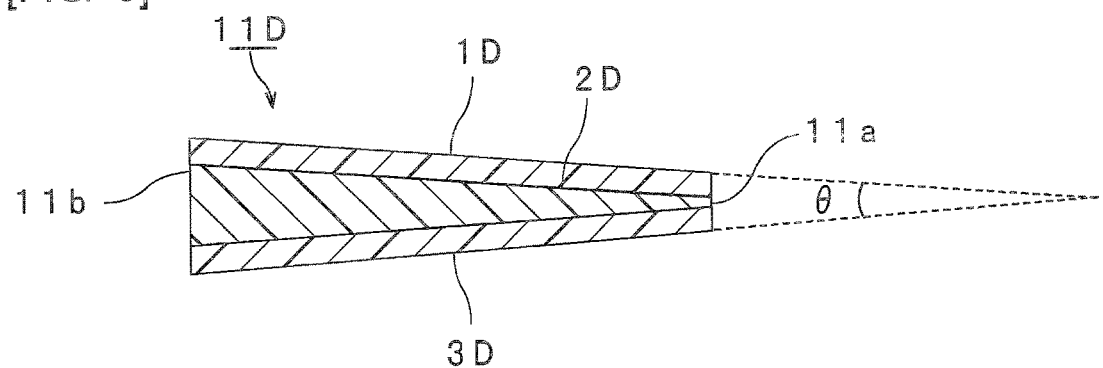
[FIG. 6]
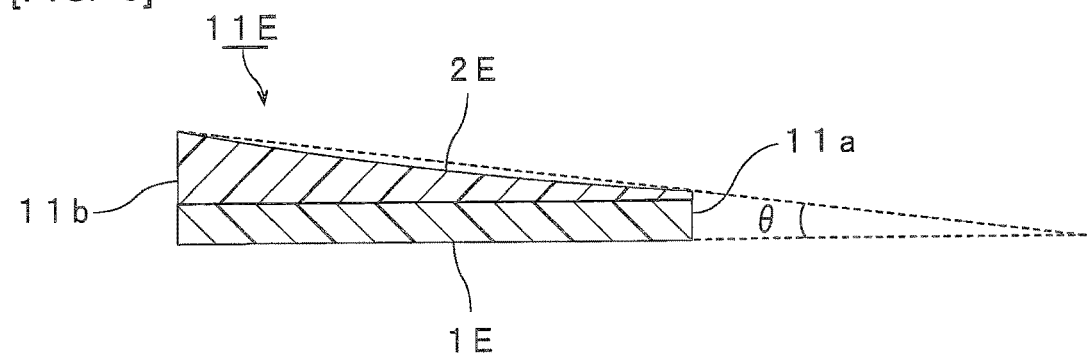
[FIG. 7]
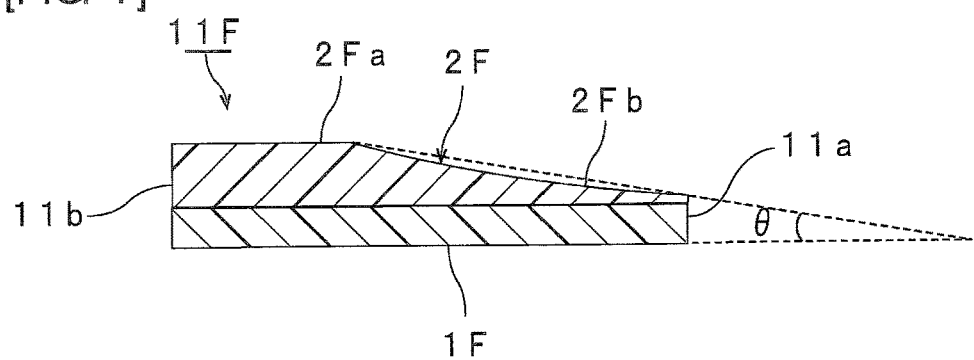

[FIG. 8]
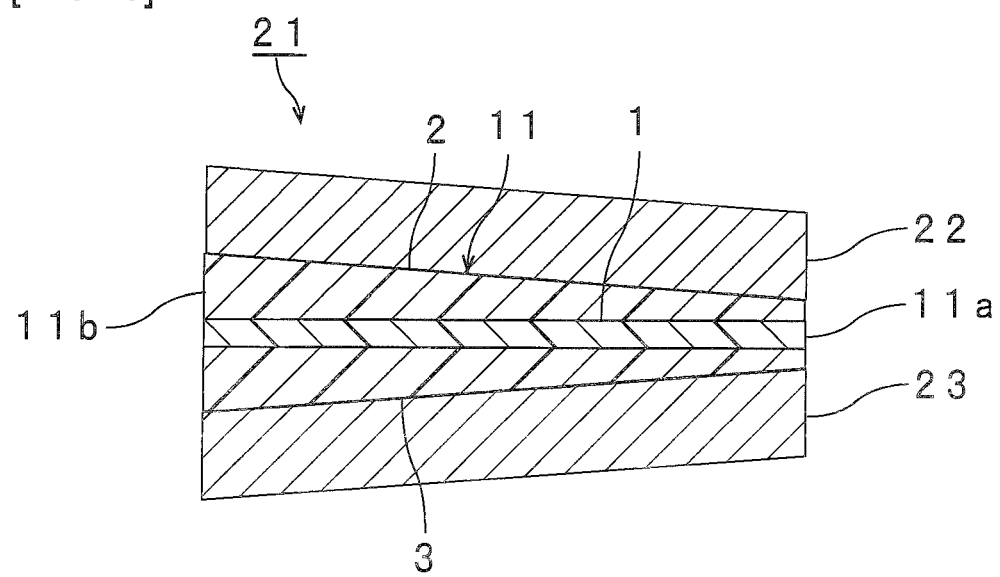
[FIG. 9]
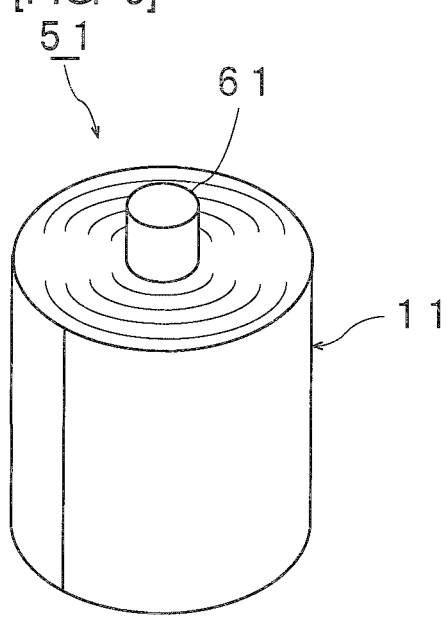

[FIG. 10]
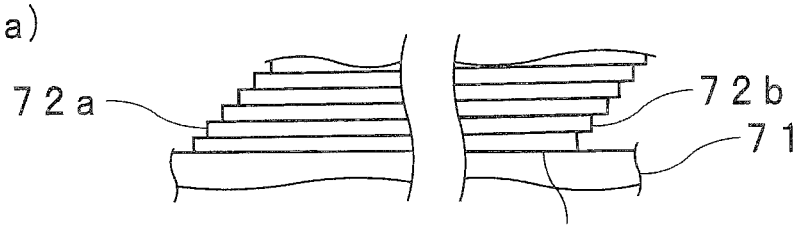
[FIG. 11]
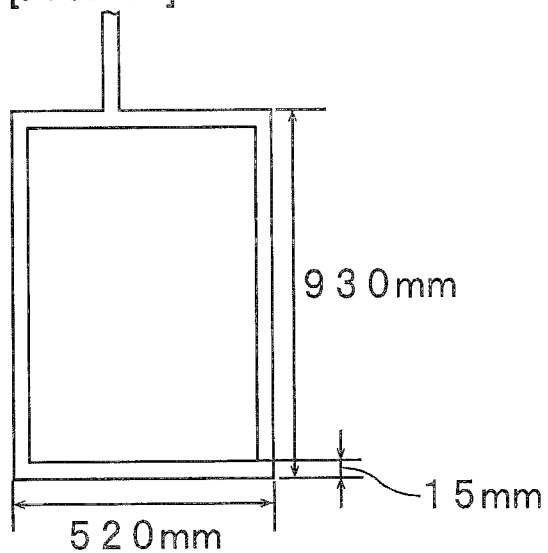

US 11,186,068 B2

INTERLAYER FOR LAMINATED GLASS, ROLL BODY, AND LAMINATED GLASS

TECHNICAL FIELD

The present invention relates to an interlayer film for laminated glass which is used for obtaining laminated glass. Moreover, the present invention relates to a roll body and laminated glass both of which are prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between a pair of glass plates.

Moreover, as the laminated glass used for automobiles, a head-up display (HUD) has been known. In the HUD, on the windshield of an automobile, measured information such as the speed which is traveling data of the automobile and the like can be displayed.

In the HUD, there is a problem that the measured information displayed on the windshield is doubly observed.

In order to suppress double images, a wedge-shaped interlayer film has been used. The following Patent Document 1 discloses a sheet of laminated glass in which a wedge-shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. As such, the display of measured information is hard to be observed doubly and the visibility of a driver is hardly hindered.

RELATED ART DOCUMENT

Patent Document
Patent Document 1: JP H4-502525 T

SUMMARY OF THE INVENTION

Problems to be Solved by the Invention

An interlayer film has been generally obtained by melt extrusion molding. In this case, the thickness of a wedge-shaped interlayer film varies in the width direction of the interlayer film.

Before laminated glass is obtained, there is a case where a wedge-shaped interlayer film is wound in the length direction to be formed into a roll body. In this case, due to the thickness difference in the width direction of the interlayer film, positional displacement between a radial directional inside interlayer film portion and a radial directional outside interlayer film portion is liable to occur. As a result, in a roll body, in both ends in the width direction of the interlayer film, positional displacement or level difference is liable to occur from the inner periphery to the outer periphery.

In recent years, in order to cope with diversification of shapes of the automobile dashboard and diversification of fitting angles of laminated glass for automobiles, a wedge-shaped interlayer film having a portion with a large wedge angle has been desired occasionally. In this case, the positional displacement between interlayer film portions in a roll body or the level difference is particularly liable to occur.

Moreover, a roll body prepared by winding a wedge-shaped interlayer film into a roll is sometimes vertically placed so that the axial center is aligned with the vertical direction. When a roll body is in a state of being vertically placed, the positional displacement between interlayer film portions in the roll body or the level difference is particularly liable to occur.

When the positional displacement between interlayer film portions in a roll body or the level difference occurs, the handling properties of the interlayer film are significantly lowered at the time of preparing laminated glass. As a result, the production efficiency of laminated glass is deteriorated and a defective product of laminated glass becomes easy to be produced.

Moreover, in order to suppress the positional displacement between interlayer film portions, it is possible to heighten the tension applied to an interlayer film at the time of winding. However, when the tension is heightened, in a portion being thin in thickness of the interlayer film, wrinkles become easy to be generated. When an interlayer film in which wrinkles are generated is used to prepare laminated glass, optical distortion becomes easy to occur.

An object of the present invention is to provide an interlayer film for laminated glass capable of being enhanced in handling properties at the time of preparing laminated glass. Moreover, the present invention is also aimed at providing a roll body and laminated glass both of which are prepared with the interlayer film for laminated glass.

Means for Solving the Problems

According to a broad aspect of the present invention, there is provided an interlayer film for laminated glass (in the present specification, sometimes described as an interlayer film) having one end and the other end being at the opposite side of the one end, the thickness of the other end being larger than the thickness of the one end and the glossiness on the surface of a maximum thickness part being 3% or more.

It is preferred that the glossiness on the surface of a maximum thickness part be 5% or more and it is more preferred that the glossiness on the surface of a maximum thickness part be 7% or more. It is preferred that the glossiness on the surface of a maximum thickness part be 40% or less.

In a specific aspect of the interlayer film according to the present invention, the absolute value of a difference between the glossiness of a minimum thickness part and the glossiness of a maximum thickness part is 2% or more and 17% or less.

In a specific aspect of the interlayer film according to the present invention, when a distance between the one end and the other end is defined as X, the maximum thickness part exists within a region of 0.5X to 1X from the one end toward the other end.

In a specific aspect of the interlayer film according to the present invention, the interlayer film further has a portion with a sectional shape of a wedge-like shape. It is preferred that the interlayer film have a wedge angle of 1.5 mrad or less.

It is preferred that the interlayer film contain a thermoplastic resin. It is preferred that the interlayer film contain a plasticizer.

In a specific aspect of the interlayer film according to the present invention, the interlayer film is provided with a first layer and a second layer arranged on a first surface side of the first layer.

In a specific aspect of the interlayer film according to the present invention, the first layer contains a polyvinyl acetal resin, the second layer contains a polyvinyl acetal resin, and the content of the hydroxyl group of the polyvinyl acetal resin in the first layer is lower than the content of the hydroxyl group of the polyvinyl acetal resin in the second layer.

In a specific aspect of the interlayer film according to the present invention, the first layer contains a polyvinyl acetal resin, the second layer contains a polyvinyl acetal resin, the first layer contains a plasticizer, the second layer contains a plasticizer, and the content of the plasticizer in the first layer relative to 100 parts by weight of the polyvinyl acetal resin in the first layer is larger than the content of the plasticizer in the second layer relative to 100 parts by weight of the polyvinyl acetal resin in the second layer.

According to a broad aspect of the present invention, there is provided a roll body including a winding core and the above-described interlayer film for laminated glass, the interlayer film for laminated glass being wound around an outer periphery of the winding core.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

Effect of the Invention

Since the interlayer film for laminated glass according to the present invention has one end and the other end being at the opposite side of the one end, the thickness of the other end is larger than the thickness of the one end, and the glossiness on the surface of a maximum thickness part is 3% or more, the handling properties at the time of preparing laminated glass can be enhanced.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view showing the first modified example of a sectional shape in the thickness direction of an interlayer film for laminated glass.

FIG. 4 is a sectional view showing the second modified example of a sectional shape in the thickness direction of an interlayer film for laminated glass.

FIG. 5 is a sectional view showing the third modified example of a sectional shape in the thickness direction of an interlayer film for laminated glass.

FIG. 6 is a sectional view showing the fourth modified example of a sectional shape in the thickness direction of an interlayer film for laminated glass.

FIG. 7 is a sectional view showing the fifth modified example of a sectional shape in the thickness direction of an interlayer film for laminated glass.

FIG. 8 is a sectional view showing an example of laminated glass prepared with the interlayer film for laminated glass shown in FIG. 1.

FIG. 9 is a perspective view schematically showing a roll body prepared by winding the interlayer film for laminated glass shown in FIG. 1.

FIGS. 10(*a*) and 10(*b*) are schematic views for illustrating an evaluation method for the winding-up appearance.

FIG. 11 is a figure for explaining a preliminary pressing method used in evaluation of double images.

MODE(S) FOR CARRYING OUT THE INVENTION

Hereinafter, the details of the present invention will be described.

The interlayer film for laminated glass (in the present specification, sometimes described as the interlayer film) according to the present invention is used for laminated glass.

The interlayer film according to the present invention has a one-layer structure or a two or more-layer structure. The interlayer film according to the present invention may have a one-layer structure and may have a two or more-layer structure. The interlayer film according to the present invention may have a two-layer structure and may have a three or more-layer structure. The interlayer film according to the present invention may be a single-layered interlayer film and may be a multi-layered interlayer film.

The interlayer film according to the present invention has one end and the other end being at the opposite side of the one end. The one end and the other end are end parts of both sides facing each other in the interlayer film. In the interlayer film according to the present invention, the thickness of the other end is larger than the thickness of the one end. An interlayer film is generally obtained by melt extrusion molding. In this case, the interlayer film has the one end and the other end respectively at both ends in the width direction (TD direction) of the interlayer film. Before laminated glass is obtained, there is a case where an interlayer film is wound in the length direction (MD direction) of the interlayer film to be formed into a roll body.

In the interlayer film according to the present invention, the glossiness on the surface of a maximum thickness part is 3% or more.

Since the interlayer film according to the present invention is provided with the above-mentioned configuration, the handling properties at the time of preparing laminated glass can be enhanced. When the interlayer film is wound to be formed into a roll body before laminated glass is obtained, positional displacement between a radial directional inside interlayer film portion and a radial directional outside interlayer film portion or level difference (winding deviation) is less liable to occur. As a result, in a roll body, in both ends in the width direction of the interlayer film, positional displacement or level difference is less liable to occur from the inner periphery to the outer periphery. In recent years, in order to cope with diversification of shapes of the automobile dashboard and diversification of fitting angles of laminated glass for automobiles, a wedge-shaped interlayer film having a portion with a large wedge angle has been desired occasionally. In this case, the positional displacement between interlayer film portions in a roll body and the level difference can be effectively suppressed. Moreover, even when the wedge angle is small, the positional displacement between interlayer film portions in a roll body can be effectively suppressed.

Moreover, a roll body prepared by winding the interlayer film into a roll is sometimes vertically placed so that the axial center is aligned with the vertical direction. Even when a roll body is in a state of being vertically placed, the positional displacement between interlayer film portions in the roll body and the level difference become difficult to occur.

Accordingly, at the time of unwinding an interlayer film portion from the roll body, wrinkles become difficult to be generated. In the present invention, the production efficiency of laminated glass can be enhanced and a defective product of laminated glass can be suppressed from being produced.

Furthermore, in the present invention, without heightening the tension applied to an interlayer film at the time of winding in order to suppress positional displacement between interlayer film portions, the positional displacement between interlayer film portions in a roll body can be made difficult to occur. As such, the tension applied to an interlayer film at the time of winding can be lowered. Since the tension can be lowered, in a portion being thin in thickness of the interlayer film, wrinkles become further difficult to be generated. By using an interlayer film in which wrinkles are suppressed to prepare laminated glass, optical distortion can be made further difficult to occur.

As a result of extensive researches, the present inventors have found out that the glossiness of the thickest portion can be controlled to create effects of the present invention because, with regard to a roll body prepared by winding an interlayer film into a roll, great force is applied to a contact face between a radial directional inside interlayer film portion and a radial directional outside interlayer film portion in the thickest portion.

The glossiness of a maximum thickness part is measured in the following manner. According to the measurement method 2 described in JIS Z8741-1997, an interlayer film is measured for the glossiness on the surface of a maximum thickness part (75° specular glossiness). As a measuring apparatus, a gloss meter "GM-26PRO/Auto" available from MURAKAMI COLOR RESEARCH LABORATORY CO., Ltd. is used to measure the interlayer film for the glossiness on the surface of a maximum thickness part. Two measured values of the glossiness on the surfaces of both sides (a first surface and a second surface at the opposite side of the first surface) of a maximum thickness part in the interlayer film are averaged to determine the glossiness on the surface of a maximum thickness part. When a maximum thickness part is apart from one end of an interlayer film by 75 mm or more and is apart from the other end of the interlayer film by 75 mm or more, a square interlayer film portion with a size of 150 mm by 150 mm centered on a point on the surface of the maximum thickness part is measured for the glossiness on the surface of a maximum thickness part. When a maximum thickness part is not apart from one end of an interlayer film by 75 mm or more, a square interlayer film portion with a size of 150 mm by 150 mm which makes a part of the one end one of its four sides is measured for the glossiness on the surface of a maximum thickness part. When a maximum thickness part is not apart from the other end of an interlayer film by 75 mm or more, a square interlayer film portion with a size of 150 mm by 150 mm which makes a part of the other end one of its four sides is measured for the glossiness on the surface of a maximum thickness part. A glossiness value as the smallest value obtained when an interlayer film portion is quietly set on a sample table and the measurement is performed while the interlayer film portion is made to rotate so that the direction of a portion to be measured corresponding to the angle against the irradiation direction of light emitted from a light source is changed is adopted as a value of the glossiness.

From the viewpoints of suppressing the winding deviation and further enhancing the handling properties at the time of preparing laminated glass, the glossiness on the surface of a maximum thickness part is preferably 5% or more, more preferably 7% or more, further preferably 8% or more, still further preferably 10% or more, especially preferably 13% or more, and most preferably 14% or more. From the viewpoint of making wrinkles become further difficult to be generated at the time of unwinding an interlayer film portion from a roll body, the glossiness on the surface of a maximum thickness part is preferably 50% or less and more preferably 40% or less.

Examples of a method of controlling the glossiness on the surface of a maximum thickness part include a method of controlling the applied pressure at the time of obtaining an interlayer film by melt extrusion molding, a method of controlling the surface shape of a roll used at the time of obtaining an interlayer film by melt extrusion molding, a method of controlling the processing temperature (film temperature and roll surface temperature) at the time of subjecting the surface of an interlayer film to emboss processing, and the like.

Although the glossiness on the surface of a part other than the maximum thickness part is not particularly limited, from the viewpoint of further enhancing the handling properties of the interlayer film, the glossiness on the surface of a minimum thickness part is preferably 5% or more, more preferably 7% or more, further preferably 8% or more, still further preferably 10% or more, especially preferably 13% or more, and most preferably 14% or more and is preferably 50% or less and more preferably 40% or less.

The glossiness of a minimum thickness part is measured in the following manner. According to the measurement method 2 described in JIS Z8741-1997, an interlayer film is measured for the glossiness on the surface of a minimum thickness part (750 specular glossiness). As a measuring apparatus, a gloss meter "GM-26PRO/Auto" available from MURAKAMI COLOR RESEARCH LABORATORY CO., Ltd. is used to measure the interlayer film for the glossiness on the surface of a minimum thickness part. Two measured values of the glossiness on the surfaces of both sides (a first surface and a second surface at the opposite side of the first surface) of a minimum thickness part in the interlayer film are averaged to determine the glossiness on the surface of a minimum thickness part. When a minimum thickness part is apart from one end of an interlayer film by 75 mm or more and is apart from the other end of the interlayer film by 75 mm or more, a square interlayer film portion with a size of 150 mm by 150 mm centered on a point on the surface of the minimum thickness part is measured for the glossiness on the surface of a minimum thickness part. When a minimum thickness part is not apart from one end of an interlayer film by 75 mm or more, a square interlayer film portion with a size of 150 mm by 150 mm which makes a part of the one end one of its four sides is measured for the glossiness on the surface of a minimum thickness part. When a minimum thickness part is not apart from the other end of an interlayer film by 75 mm or more, a square interlayer film portion with a size of 150 mm by 150 mm which makes a part of the other end one of its four sides is measured for the glossiness on the surface of a minimum thickness part. A glossiness value as the smallest value obtained when an interlayer film portion is quietly set on a sample table and the measurement is performed while the interlayer film portion is made to rotate so that the direction of a portion to be measured corresponding to the angle against the irradiation direction of light emitted from a light source is changed is adopted as a value of the glossiness.

Examples of the measuring apparatus for glossiness include "GM-26PRO/Auto" available from MURAKAMI COLOR RESEARCH LABORATORY CO., Ltd. and the like.

From the viewpoint of further enhancing the handling properties at the time of preparing laminated glass, the absolute value of a difference between the glossiness of a minimum thickness part and the glossiness of a maximum thickness part is preferably 2% or more, more preferably 4% or more, and further preferably 7% or more. From the viewpoint of enhancing the degassing properties at the time of preparing laminated glass, the absolute value of a difference between the glossiness of a minimum thickness part and the glossiness of a maximum thickness part is preferably 17% or less and more preferably 12% or less.

A distance between the one end and the other end is defined as X. From the viewpoints of suppressing the winding deviation and further enhancing the handling properties at the time of preparing laminated glass, it is preferred that the maximum thickness part exist within a region of 0.5X to 1X from the one end toward the other end and it is more preferred that the maximum thickness part exist within a region of 0.7X to 1X from the one end toward the other end. In this case, the maximum thickness part exists at any position within the above-mentioned range.

From the viewpoints of suppressing the winding deviation and further enhancing the handling properties at the time of preparing laminated glass, it is preferred that the minimum thickness part exist within a region of 0X to 0.5X from the one end toward the other end and it is more preferred that the minimum thickness part exist within a region of 0X to 0.3X from the one end toward the other end. In this case, the minimum thickness part exists at any position within the above-mentioned range.

Hereinafter, specific embodiments of the present invention will be described with reference to the drawings.

FIG. 1 is a sectional view schematically showing an interlayer film for laminated glass in accordance with a first embodiment of the present invention.

In FIG. 1, a section in the thickness direction of an interlayer film 11 is shown. In this connection, in FIG. 1 and a figure described below, for convenience of illustration, the thicknesses of an interlayer film and respective layers constituting the interlayer film and the wedge angle θ are shown so as to be different from actual thicknesses thereof and an actual wedge angle.

The interlayer film 11 is provided with a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film. A lamination glass member is layered on the surface layer.

The interlayer film 11 has one end 11a and the other end 11b at the opposite side of the one end 11a. The one end 1a and the other end 11b are end parts of both sides facing each other. The sectional shape in the thickness direction of each of the second layer 2 and the third layer 3 is a wedge-like shape. The sectional shape in the thickness direction of the first layer 1 is a rectangular shape. The thickness of the one end 11a side of each of the second layer 2 and the third layer 3 is thinner than that of the other end 11b side thereof. Accordingly, the thickness of the one end 11a of the interlayer film 11 is thinner than the thickness of the other end 11b thereof. Accordingly, the interlayer film 11 has a region being thin in thickness and a region being thick in thickness.

The difference between the maximum thickness and the minimum thickness in the first layer 1 is smaller than the difference between the maximum thickness and the minimum thickness in the second layer 2. The difference between the maximum thickness and the minimum thickness in the first layer 1 is smaller than the difference between the maximum thickness and the minimum thickness in the third layer 3.

In this connection, in FIG. 1, the right-left direction (crosswise direction) corresponds to the TD direction, the up-down direction (vertical direction) corresponds to the thickness direction, and the direction connecting the front side and the inner side corresponds to the MD direction.

FIG. 9 is a perspective view schematically showing a roll body prepared by winding the interlayer film for laminated glass shown in FIG. 1.

An interlayer film 11 may be wound to be formed into a roll body 51 of the interlayer film 11.

The roll body 51 shown in FIG. 9 is provided with a winding core 61 and the interlayer film 11. The interlayer film 11 is wound around an outer periphery of the winding core 61.

FIG. 2 is a sectional view schematically showing an interlayer film for laminated glass in accordance with a second embodiment of the present invention.

The interlayer film 11A shown in FIG. 2 is provided with a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The sectional shape in the thickness direction of the first layer 1A corresponding to the interlayer film 11A is a wedge-like shape. The interlayer film 11A has one end 11a and the other end 11b at the opposite side of the one end 11a. The one end 11a and the other end 11b are end parts of both sides facing each other. The thickness of the one end 11a of the interlayer film 11A is thinner than the thickness of the other end 11b thereof. Accordingly, the first layer 1A corresponding to the interlayer film 11A has a region being thin in thickness and a region being thick in thickness.

The interlayer film 11 shown in FIG. 1 has a structure in which the rectangular-shaped first layer 1 is sandwiched between the wedge-shaped second layer 2 and the wedge-shaped third layer 3. In FIGS. 3 to 7, the first to fifth modified examples in which the interlayer film is changed in the shape of each layer are shown.

An interlayer film 11B in accordance with the first modified example shown in FIG. 3 is provided with a first layer 1B having a sectional shape in the thickness direction of a wedge-like shape, a second layer 2B having a sectional shape in the thickness direction of a wedge-like shape, and a third layer 3B having a sectional shape in the thickness direction of a wedge-like shape. The first layer 1B is arranged between the second layer 2B and the third layer 3B to be sandwiched therebetween.

The thickness of one end 11a side of each of the first layer 1B, the second layer 2B, and the third layer 3B is thinner than that of the other end 11b side thereof. Accordingly, the interlayer film 11B has a region being thin in thickness and a region being thick in thickness.

An interlayer film 11C in accordance with the second modified example shown in FIG. 4 is provided with a first layer 1C having a sectional shape in the thickness direction of a rectangular shape, a second layer 2C having a sectional shape in the thickness direction of a wedge-like shape, and a third layer 3C having a sectional shape in the thickness direction of a rectangular shape. The first layer LC is arranged between the second layer 2C and the third layer 3C to be sandwiched therebetween. The thickness of one end 11a side of the second layer 2C is thinner than that of the other end 11b side thereof. Accordingly, the interlayer film 11C has a region being thin in thickness and a region being thick in thickness. A single-layered interlayer film having the same shape as the interlayer film 11C may be adopted.

An interlayer film 11D in accordance with the third modified example shown in FIG. 5 is provided with a first layer 1D having a sectional shape in the thickness direction of a rectangular shape, a second layer 2D having a sectional shape in the thickness direction of a wedge-like shape, and a third layer 3D having a sectional shape in the thickness direction of a rectangular shape. The second layer 2D is arranged between the first layer 1D and the third layer 3D to be sandwiched therebetween. The thickness of one end 11a side of the second layer 2D is thinner than that of the other end 11b side thereof. Accordingly, the interlayer film 11D has a region being thin in thickness and a region being thick in thickness.

An interlayer film 11E in accordance with the fourth modified example shown in FIG. 6 is provided with a first layer 1E having a sectional shape in the thickness direction of a rectangular shape and a second layer 2E having a sectional shape in the thickness direction of a wedge-like shape. The second layer 2E is arranged on a first surface side of the first layer LE to be layered thereon. The thickness of one end 11a side of the second layer 2E is thinner than that of the other end 11b side thereof. Accordingly, the interlayer film 11E has a region being thin in thickness and a region being thick in thickness.

An interlayer film 11F in accordance with the fifth modified example shown in FIG. 7 is provided with a first layer 1F having a sectional shape in the thickness direction of a rectangular shape and a second layer 2F having a portion 2Fa with a sectional shape in the thickness direction of a rectangular shape and a portion 2Fb with a sectional shape in the thickness direction of a wedge-like shape. The second layer 2F is arranged on a first surface side of the first layer 1F to be layered thereon. The thickness of one end 11a side of the second layer 2F is thinner than that of the other end 11b side thereof. Accordingly, the interlayer film 11F has a region being thin in thickness and a region being thick in thickness. A single-layered interlayer film having the same shape as the interlayer film 11F may be adopted.

It is preferred that the interlayer film have a portion with a sectional shape in the thickness direction of a wedge-like shape. It is preferred that the interlayer film have a portion where the thickness is gradually thickened from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In order to suppress double images, the wedge angle θ of the interlayer film can be appropriately set according to the fitting angle of laminated glass. From the viewpoint of further suppressing double images, the wedge angle θ of the interlayer film is preferably 0.2 mrad (0.0115 degrees) or more and is preferably 2 mrad (0.1146 degrees) or less, more preferably 1.5 mrad (0.0859 degrees) or less, and further preferably 0.7 mrad (0.0401 degrees) or less. The wedge angle θ of an interlayer film is an interior angle formed at the intersection point between a straight line connecting a point on the first surface of the maximum thickness part of the interlayer film and a point on the first surface of the minimum thickness part thereof and a straight line connecting a point on the second surface of the maximum thickness part of the interlayer film and a point on the second surface of the minimum thickness part thereof.

The interlayer film may have a colored band area in a partial region. The interlayer film may have a colored region in a partial region. When a multi-layered interlayer film has a colored band area or a colored region, it is preferred that a surface layer have a colored band area or a colored region. However, an intermediate layer may have a colored band area or a colored region. For example, at the time of extrusion-molding an interlayer film or at the time of extrusion-molding the respective layers of the interlayer film, a prescribed region can be blended with a coloring agent to form the colored band area or the colored region.

The thickness of the interlayer film is not particularly limited. The thickness of the interlayer film refers to the total thickness of the respective layers constituting the interlayer film. Thus, in the case of a multi-layered interlayer film 11, the thickness of the interlayer film 11 refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm, and further preferably 1.5 mm or less.

When the distance between one end and the other end is defined as X, it is preferred that the interlayer film have a minimum thickness in a region within a distance of 0X to 0.2X from the one end toward the inside and have a maximum thickness in a region within a distance of 0X to 0.2X from the other end toward the inside, and it is more preferred that the interlayer film have a minimum thickness in a region within a distance of 0X to 0.1X from the one end toward the inside and have a maximum thickness in a region within a distance of 0X to 0.1X from the other end toward the inside. It is preferred that one end of the interlayer film have a minimum thickness and the other end of the interlayer film have a maximum thickness. In the interlayer films 11, 11A, 11B, 11C, 11D, 11E, and 11F, the one end 11a has a minimum thickness and the other end 11b has a maximum thickness.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more and is preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, further preferably 0.2 mm or more and is preferably 0.8 mm or less, more preferably 0.6 mm or less, and further preferably 0.3 mm or less.

The distance X between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

The interlayer film according to the present invention has a one-layer structure or a two or more-layer structure. The interlayer film according to the present invention may have a one-layer structure, may have a two or more-layer structure, and may have a three or more-layer structure. The interlayer film according to the present invention is provided with a first layer. The interlayer film according to the present invention may be a single-layered interlayer film provided with only a first layer and may be a multi-layered interlayer film provided with a first layer and another layer.

The interlayer film may have a two or more-layer structure and may be provided with a second layer in addition to a first layer. It is preferred that the interlayer film be provided with the second layer as a surface layer of the interlayer film. When the interlayer film is provided with the second layer, the second layer is arranged on a first surface side of the first layer. In this case, the second layer may be directly layered on the first layer and an additional layer may be arranged between the first layer and the second layer.

The interlayer film may have a three or more-layer structure and may be provided with a third layer in addition to a first layer and a second layer. It is preferred that the interlayer film be provided with the third layer as a surface layer of the interlayer film. When the interlayer film is provided with the third layer, the third layer is arranged on a second surface side opposite to the first surface of the first layer. When the interlayer film is provided with the third layer, the first layer is arranged between the second layer and the third layer. In this case, the third layer may be directly layered on the first layer and an additional layer may be arranged between the first layer and the third layer.

Hereinafter, the details of materials constituting the respective layers of a multi-layered interlayer film and the single-layered interlayer film will be described.

(Thermoplastic Resin)

It is preferred that the interlayer film (the respective layers) contain a thermoplastic resin (hereinafter, sometimes described as a thermoplastic resin (0)) and it is preferred that the interlayer film (the respective layers) contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)) and it is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)) and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)) and it is preferred that the third layer contain a polyvinyl acetal resin (hereinafter, sometimes described as a polyvinyl acetal resin (3)) as the thermoplastic resin (3). Although the thermoplastic resin (1), the thermoplastic resin (2), and the thermoplastic resin (3) may be the same as or different from one another, it is preferred that the thermoplastic resin (1) be different from the thermoplastic resin (2) and the thermoplastic resin (3) because the sound insulating properties are further heightened. Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further heightened. One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of a layer containing the polyvinyl acetal resin and the plasticizer to a lamination glass member or another layer is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more and is preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more and is preferably 28% by mole or less, more preferably 27% by mole or less, further preferably 25% by mole or less, and especially preferably 24% by mole or less. When the content of the hydroxyl group is the above lower limit or more, the mechanical strength of the interlayer film is further heightened. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, and especially preferably 33% by mole or more and is preferably 38% by mole or less, more preferably 37% by mole or less, further preferably 36.5% by mole or less, and especially preferably 36% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further heightening the sound insulating properties, it is preferred that the content of the hydroxyl group of the polyvinyl acetal resin (1) be lower than the content of the hydroxyl group of the polyvinyl acetal resin (3). From the viewpoint of still further heightening the sound insulating properties, the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 1% by mole or more, more preferably 5% by mole or more, further preferably 9% by mole or more, especially preferably 10% by mole or more, and most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, and further preferably 9% by mole or more and is preferably 30% by mole or less, more preferably 25% by mole or less, further preferably 24% by mole or less, and especially preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more and more preferably 0.5% by mole or more and is preferably 10% by mole or less and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, and further preferably 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

The acetalization degree can be calculated by a method in accordance with JIS K6728 "Testing methods for polyvinyl butyral" or a method in accordance with ASTM D1396-92.

In this connection, it is preferred that the content of the hydroxyl group (the amount of hydroxyl groups), the acetalization degree (the butyralization degree), and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree), and the acetylation degree can be calculated from the results measured by a method in accordance with JIS K6728 "Testing methods for polyvinyl butyral".

(Plasticizer)

From the viewpoint of further heightening the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

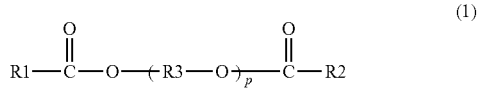

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

The content of the plasticizer (0) relative to 100 parts by weight of the thermoplastic resin (0) in the interlayer film is preferably 25 parts by weight or more and more preferably 30 parts by weight or more and is preferably 100 parts by weight or less, more preferably 60 parts by weight or less, and further preferably 50 parts by weight or less. When the content of the plasticizer (0) is the above lower limit or more, the penetration resistance of laminated glass is further enhanced. When the content of the plasticizer (0) is the above upper limit or less, the transparency of the interlayer film is further enhanced.

The content of the plasticizer (1) (hereinafter, sometimes described as the content (1)) relative to 100 parts by weight of the thermoplastic resin (1) is preferably 50 parts by weight or more, more preferably 55 parts by weight or more, and further preferably 60 parts by weight or more and is preferably 100 parts by weight or less, more preferably 90 parts by weight or less, further preferably 85 parts by weight or less, and especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

Each of the content of the plasticizer (2) (hereinafter, sometimes described as the content (2)) relative to 100 parts by weight of the thermoplastic resin (2) and the content of the plasticizer (3) (hereinafter, sometimes described as the content (3)) relative to 100 parts by weight of the thermoplastic resin (3) is preferably 10 parts by weight or more, more preferably 15 parts by weight or more, further preferably 20 parts by weight or more, and especially preferably 24 parts by weight or more and is preferably 40 parts by weight or less, more preferably 35 parts by weight or less, further preferably 32 parts by weight or less, and especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

(Heat Shielding Compound)

It is preferred that the interlayer film contain a heat shielding compound. It is preferred that the first layer contain a heat shielding compound. It is preferred that the second layer contain a heat shielding compound. It is preferred that the third layer contain a heat shielding compound. One kind of the heat shielding compound may be used alone and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, and especially preferably 0.02% by weight or more and is preferably 0.2% by weight or less, more preferably 0.1% by weight or less, further preferably 0.05% by weight or less, and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more and is preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), the content of the heat shielding particles (in particular, the content of tungsten oxide particles) is preferably 0.01% by weight or more, more preferably 0.1% by weight or more, further preferably 1% by weight or more, and especially preferably 1.5% by weight or more and is preferably 6% by weight or less, more preferably 5.5% by weight or less, further preferably 4% by weight or less, especially preferably 3.5% by weight or less, and most preferably 3% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member such as a glass plate or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of the interlayer film or in 100% by weight of a layer containing the ultraviolet ray screening agent (a first layer, a second layer, or a third layer), the content of the ultraviolet ray screening agent, for example, the content of the benzotriazole compound, is preferably 0.1% by weight or more, more preferably 0.2% by weight or more, further preferably 0.3% by weight or more, and especially preferably 0.5% by weight or more and is preferably 2.5% by weight or less, more preferably 2% by weight or less, further preferably 1% by weight or less, and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a flame retardant, an antistatic agent, a pigment, a dye, a moisture-resistance improving agent, a fluorescent brightening agent, and an infrared ray absorber, as necessary. One kind of these additives may be used alone and two or more kinds thereof may be used in combination.

(Laminated Glass)

FIG. 8 is a sectional view showing an example of laminated glass prepared with the interlayer film for laminated glass shown in FIG. 1.

The laminated glass 21 shown in FIG. 8 is provided with an interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the sheet of organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and preferably 5 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for building or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

The laminated glass is a kind of laminated glass serving as a head-up display (HUD). In the laminated glass, measured information such as the speed which is sent from a control unit and the like can be projected onto the windshield from a display unit of the instrumental panel. As such, without making a driver of an automobile move his or her visual field downward, a front visual field and measured information can be visually recognized simultaneously.

Hereinafter, the present invention will be described in more detail with reference to examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree, and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Example 1

Preparation of Composition for Forming First Layer:
One hundred parts by weight of a polyvinyl acetal resin (the content of the hydroxyl group of 22% by mole, the acetylation degree of 13% by mole, the acetalization degree of 65% by mole, the average polymerization degree of 3000), 60 parts by weight of a plasticizer (3GO), 0.2 parts by weight of an ultraviolet ray screening agent (Tinuvin 326), and 0.2 parts by weight of an oxidation inhibitor (BHT, "H-BHT" available from Sakai Chemical Industry Co., Ltd.) were thoroughly mixed using a mixing roll to obtain a composition for forming a first layer.

Preparation of Composition for Forming Second Layer and Third Layer:
One hundred parts by weight of a polyvinyl acetal resin (the content of the hydroxyl group of 30.6% by mole, the acetylation degree of 0.9% by mole, the acetalization degree of 68.5% by mole, the average polymerization degree of 1700), 38 parts by weight of a plasticizer (3GO), 0.2 parts by weight of an ultraviolet ray screening agent (Tinuvin 326), and 0.2 parts by weight of an oxidation inhibitor (BHT, "H-BHT" available from Sakai Chemical Industry Co., Ltd.) were thoroughly mixed using a mixing roll to obtain a composition for forming a second layer and a third layer.

Preparation of Interlayer Film:
The composition for forming a first layer and the composition for forming a second layer and a third layer were coextruded into an interlayer film with an extruder, the surface of the interlayer film was embossed by an embossing roll method, and the interlayer film was held at 130° C. for a period of holding time of 1 minute, after which the temperature thereof was decreased to 25° C. and the interlayer film was wound into a roll to obtain a roll body. In this connection, applied pressures to the maximum thickness part and the minimum thickness part were set differently from each other within the applied pressure range of 2.4 to 3.0 MPa to perform emboss processing at a film temperature of 100 to 120° C. A three-layered interlayer film having a sectional shape in the thickness direction of a wedge-like shape and having a structure with a stack of a second layer/a first layer/a third layer was prepared. Under the condition of the winding tension of 1.3 N/cm, 125 m of the interlayer film was wound around a winding core (material: talc-containing polypropylene) (15 cm in outer diameter, 120 cm in height) available from KOGA POLYMER CO., LTD. to obtain a roll body.

In this connection, the thickness ratio of Second layer: First layer:Third layer was determined to be 3.5:1:3.5 at the first position apart from the one end by 0.05X toward the other end, the total thereof was determined to be 800 μm, and the first layer, the second layer, and the third layer each were determined to have a sectional shape in the thickness direction of a wedge-like shape. Moreover, the distance between the one end and the other end was determined to be 1 m. When the distance between the one end and the other end was defined as X, the three-layered interlayer film was determined to have a maximum thickness part at a position apart from the one end by 1X toward the other end and a minimum thickness part at a position apart from the one end by 0X toward the other end.

Examples 2 to 8 and Comparative Examples 1 to 3

A roll body was obtained in the same manner as that in Example 1 except that the wedge angle, the glossiness on the surface of a maximum thickness part, the glossiness on the surface of a maximum thickness part, the position of maximum thickness, and the position of minimum thickness were set to those listed in the following Table 1. In this connection, when the distance between the one end and the other end was defined as X, respective interlayer films were determined to have a maximum thickness part at a position apart from the one end by a distance shown in the following Table 1 toward the other end (at a position of maximum thickness shown in the following Table 1) and a minimum thickness part at a position apart from the one end by a distance shown in the following Table 1 toward the other end (at a position of minimum thickness shown in the following Table 1).

In this connection, the glossiness was adjusted by changing the applied pressure at the time of emboss processing within the range of 2.4 to 3.0 MPa.

Example 9

Preparation of Composition for Forming First Layer (Interlayer Film):
One hundred parts by weight of a polyvinyl acetal resin (the content of the hydroxyl group of 30.6% by mole, the acetylation degree of 0.9% by mole, the acetalization degree of 68.5% by mole, the average polymerization degree of 1700), 40 parts by weight of a plasticizer (3GO), 0.2 parts by weight of an ultraviolet ray screening agent (Tinuvin 326), and 0.2 parts by weight of an oxidation inhibitor (BHT, "H-BHT" available from Sakai Chemical Industry Co., Ltd.) were thoroughly mixed using a mixing roll to obtain a composition for forming a first layer.

Preparation of Interlayer Film:
The composition for forming a first layer was extruded into an interlayer film with an extruder, the surface of the interlayer film was embossed by an embossing roll method, and the interlayer film was held at 130° C. for a period of holding time of 1 minute, after which the temperature thereof was decreased to 25° C. and the interlayer film was wound into a roll to obtain a roll body. In this connection, applied pressures to the maximum thickness part and the minimum thickness part were set differently from each other within the applied pressure range of 2.4 to 3.0 MPa to perform emboss processing at a film temperature of 100 to 120° C. A one-layered interlayer film having a sectional shape in the thickness direction of a wedge-like shape and having a structure singly constituted by a first layer was prepared. Under the condition of the winding tension of 1.3 N/cm, 125 m of the interlayer film was wound around a winding core (material: talc-containing polypropylene) (15 cm in outer diameter, 120 cm in height) available from KOGA POLYMER CO., LTD. to obtain a roll body.

In this connection, the thickness of the first layer was determined to be 780 μm at the first position apart from the one end by 0.05X toward the other end and the first layer was determined to have a sectional shape in the thickness direction of a wedge-like shape. Moreover, the distance between the one end and the other end was determined to be 1 m. When the distance between the one end and the other end was defined as X, the one-layered interlayer film was determined to have a maximum thickness part at a position apart from the one end by 1X toward the other end and a minimum thickness part at a position apart from the one end by 0X toward the other end.

Example 10 and Comparative Example 4

A roll body was obtained in the same manner as that in Example 9 except that the wedge angle, the glossiness on the surface of a maximum thickness part, the glossiness on the surface of a maximum thickness part, the position of maximum thickness, and the position of minimum thickness were set to those listed in the following Table 2. In this connection, when the distance between the one end and the other end was defined as X, respective interlayer films were determined to have a maximum thickness part at a position apart from the one end by a distance shown in the following Table 2 toward the other end (at a position of maximum thickness shown in the following Table 2) and a minimum thickness part at a position apart from the one end by a distance shown in the following Table 2 toward the other end (at a position of minimum thickness shown in the following Table 2). In this connection, a region of 0.5X to 1X in the interlayer film prepared in Example 1 was determined to have a uniform thickness, and the maximum thickness part was determined to exist within a region of 0.5X to 1X.

In this connection, the glossiness was adjusted by changing the film temperature at the time of emboss processing within the range of 100 to 120° C.

(Evaluation)
(1) Glossiness

According the measurement method 2 described in JIS Z8741-1997, an interlayer film was measured for the glossiness on the surface of each of the maximum thickness part and the minimum thickness part (750 specular glossiness). As a measuring apparatus, a gloss meter "GM-26PRO" available from MURAKAMI COLOR RESEARCH LABORATORY CO., Ltd. was used to measure the interlayer film for the glossiness on the surface of each of the maximum thickness part and the minimum thickness part. Two measured values of the glossiness on the surfaces of both sides (a first surface and a second surface at the opposite side of the first surface) of each of the maximum thickness part and the minimum thickness part in the interlayer film were averaged to determine the glossiness on the surface of each of the maximum thickness part and the minimum thickness part. In this connection, a square interlayer film portion with a size of 150 mm by 150 mm described above was measured for the glossiness on the surface of each of the maximum thickness part and the minimum thickness part. A glossiness value as the smallest value obtained when an interlayer film portion is quietly set on a sample table and the measurement is performed while the interlayer film portion is made to rotate so that the direction of a portion to be measured corresponding to the angle against the irradiation direction of light emitted from a light source is changed was adopted as the value of the glossiness.

(2) Winding-Up Appearance 1

The obtained roll body was evaluated whether or not the interlayer film was displaced continuously from the inner periphery to the outer periphery in the width direction of the interlayer film. In FIG. 10(a), a state in which an interlayer film 72 is displaced continuously from the inner periphery, being at a winding core 71 side, to the outer periphery in the width direction of the interlayer film 72 was shown. In this connection, in FIG. 10(a), from one end 72a side toward the other end 72b side of the interlayer film 72, the interlayer film is displaced continuously.

[Criteria for Judgment in Winding-Up Appearance 1]
o: The interlayer film was not displaced continuously from the inner periphery to the outer periphery in the width direction of the interlayer film.
x: The interlayer film was displaced continuously from the inner periphery to the outer periphery in the width direction of the interlayer film.

(3) Winding-Up Appearance 2

The obtained roll body was evaluated whether or not a plurality of radial directional outside interlayer film portions was positionally displaced from a plurality of radial directional inside interlayer film portions in the width direction of the interlayer film. In FIG. 10(b), a state in which a plurality of radial directional outside interlayer film portions is positionally displaced from a plurality of radial directional inside interlayer film portions, being at a winding core 71 side, in the width direction of the interlayer film 72 was shown. In this connection, in FIG. 10(b), from one end 71a side toward the other end 72b side of the interlayer film 72, a plurality of radial directional outside interlayer film portions is positionally displaced from a plurality of radial directional inside interlayer film portions.

[Criteria for Judgment in Winding-Up Appearance 2]
o: A plurality of radial directional outside interlayer film portions was not positionally displaced from a plurality of radial directional inside interlayer film portions in the width direction of the interlayer film.
x: A plurality of radial directional outside interlayer film portions was positionally displaced from a plurality of radial directional inside interlayer film portions in the width direction of the interlayer film.

(4) Optical Distortion

With the use of the obtained roll body, two sheets of glass plates (clear glass, the size of 900 mm×600 mm, 1.7 mm in thickness) were bonded together with an interlayer film interposed therebetween to prepare a sheet of laminated glass. On this occasion, laminated glass in which the other end portion of its original interlayer film is contained was obtained. The obtained sheet of laminated glass was irradiated with intense light emitted from a light source, the light was made to pass through the sheet of laminated glass to be projected on a screen, and whether there is a dark part or not was confirmed to determine the optical distortion. In this connection, when the occurrence of optical distortion was confirmed, wrinkles were observed in the interlayer film.

[Criteria for Judgment in Optical Distortion]
oo: There is no dark part at all.
o: A dark part is slightly viewed but cannot be confirmed almost at all.
x: A dark part can be clearly confirmed visually.

(5) Double Images

A pair of glass plates (clear glass, the size of 510 mm×920 mm, 2.0 mm in thickness) was prepared. An interlayer film with a size corresponding to the size of the glass plate was sandwiched between the pair of glass plates to obtain a laminate. As shown in FIG. 11, the obtained laminate was fitted into a frame of an EPDM-made rubber tube (frame member). The rubber tube had a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a sheet of laminated glass.

The obtained sheet of laminated glass was installed at a position of the windshield. The information to be displayed, which is emitted from a display unit installed below the sheet of laminated glass, was reflected in the sheet of laminated glass to visually confirm the presence or absence of double images at a prescribed position. The double images were judged according to the following criteria.

[Criteria for Judgment in Double Images]
o: Double images are not confirmed.
x: Double images are confirmed.

The details and the results are shown in the following Tables 1 and 2. In Tables 1 and 2, "-" refers to not being evaluated.

TABLE 1

| | Number of layers | Glossiness of maximum thickness part (%) | Glossiness of minimum thickness part (%) | Position of maximum thickness | Position of minimum thickness | Wedge angle (mrad) |
|---|---|---|---|---|---|---|
| Ex. 1 | 3 | 3 | 14 | 1X | ○X | 0.21 |
| Ex. 2 | 3 | 8 | 10 | 1X | ○X | 0.38 |
| Ex. 3 | 3 | 12 | 8 | 1X | ○X | 0.55 |
| Ex. 4 | 3 | 23 | 6 | 1X | ○X | 0.68 |
| Ex. 5 | 3 | 7 | 9 | 1X | ○X | 0.7 |
| Ex. 6 | 3 | 14 | 7 | 1X | ○X | 0.45 |
| Ex. 7 | 3 | 40 | 23 | 1X | ○X | 0.7 |
| Ex. 8 | 3 | 13 | 17 | 1X | ○X | 1.5 |
| Comp. Ex. 1 | 3 | 1 | 25 | 1X | ○X | 0.7 |
| Comp. Ex. 2 | 3 | 2 | 18 | 1X | ○X | 0.55 |
| Comp. Ex. 3 | 3 | 2 | 16 | 1X | ○X | 0.38 |

| | Winding-up appearance 1 | Winding-up appearance 2 | Optical distortion | Double images |
|---|---|---|---|---|
| Ex. 1 | ○ | ○ | ○ | ○ |
| Ex. 2 | ○ | ○ | ○ | ○ |
| Ex. 3 | ○ | ○ | ○○ | ○ |
| Ex. 4 | ○ | ○ | ○○ | ○ |
| Ex. 5 | ○ | ○ | ○ | ○ |
| Ex. 6 | ○○ | ○ | ○○ | ○ |
| Ex. 7 | ○ | ○ | ○○ | ○ |
| Ex. 8 | ○ | ○ | ○ | ○ |
| Comp. Ex. 1 | ○ | X | X | ○ |
| Comp. Ex. 2 | ○ | X | X | ○ |
| Comp. Ex. 3 | ○ | X | X | ○ |

TABLE 2

| | Number of layers | Glossiness of maximum thickness part (%) | Glossiness of minimum thickness part (%) | Position of maximum thickness | Position of minimum thickness | Wedge angle (mrad) |
|---|---|---|---|---|---|---|
| Ex. 9 | 1 | 5 | 6 | 1X | ○X | 0.5 |
| Ex. 10 | 1 | 17 | 19 | 0.75X | ○X | 0.4 |
| Comp. Ex. 4 | 1 | 2 | 4 | 1X | ○X | 0.5 |

| | Winding-up appearance 1 | Winding-up appearance 2 | Optical distortion | Double images |
|---|---|---|---|---|
| Ex. 9 | ○ | ○ | ○○ | ○ |
| Ex. 10 | ○ | ○ | ○ | ○ |
| Comp. Ex. 4 | X | — | — | ○ |

In this connection, sheets of laminated glass prepared with interlayer films obtained in Examples 1 to 8 respectively were evaluated for the sound insulating properties with sound transmission losses, and as a result, it was confirmed that the sheets were excellent in sound insulating properties.

EXPLANATION OF SYMBOLS

1, 1A, 1B, 1C, 1D, 1E, 1F: First layer
2, 2B, 2C, 2D, 2E, 2F: Second layer
2Fa: Portion having sectional shape in thickness direction of rectangular shape
2Fb: Portion having sectional shape in thickness direction of wedge-like shape
3, 3B, 3C, 3D: Third layer
11, 11A, 11B, 11C, 11D, 11E, 11F: Interlayer film
11a: One end
11b: The other end
21: Laminated glass
22: First lamination glass member
23: Second lamination glass member
51: Roll body
61: Winding core
71: Winding core
72: Interlayer film
72a: One end
72b: The other end

The invention claimed is:
1. An interlayer film for laminated glass, having one end and an other end being at the opposite side of the one end, the thickness of the other end being larger than the thickness of the one end, a maximum thickness part existing within a region of 0.5X to 1X from the one end toward the other end and a minimum thickness part existing within a region of 0X to 0.5X from the one end toward the other end, where X is a distance between the one end and the other end, a glossiness on a surface of the minimum thickness part being different from a glossiness on a surface of the maximum thickness part, the glossiness on the surface of the minimum thickness part being higher than the glossiness on the surface of the maximum thickness part, the glossiness on the surface of the maximum thickness part being 3% or more, and the absolute value of a difference between the glossiness on the surface of the minimum thickness part and the glossiness on the surface of the maximum thickness part being 12% or less, wherein the glossinesses on the surface of each of the minimum thickness part and maximum thickness part are measured according to a measurement method described in JIS Z8741-1997, the measurement method comprises measuring a glossiness value on the surface of an interlayer film portion while rotating the interlayer film portion such that the measurement direction corresponding to the angle against the irradiation direction of light emitted from a light source is changed, and each of the glossinesses of the minimum thickness part and maximum thickness part corresponds to the smallest value of the glossiness value obtained from the measurement method.

2. The interlayer film for laminated glass according to claim 1, wherein the glossiness on the surface of the maximum thickness part is 5% or more.

3. The interlayer film for laminated glass according to claim 2, wherein the glossiness on the surface of the maximum thickness part is 7% or more.

4. The interlayer film for laminated glass according to claim 1, wherein the glossiness on the surface of the maximum thickness part is 40% or less.

5. The interlayer film for laminated glass according to claim 1, wherein the absolute value of a difference between the glossiness on the surface of the minimum thickness part and the glossiness on the surface of the maximum thickness part is 2% or more and 12% or less.

6. The interlayer film for laminated glass according to claim 1, further having a portion with a sectional shape of a wedge-like shape.

7. The interlayer film for laminated glass according to claim 6, further having a wedge angle of 1.5 mrad or less.

8. The interlayer film for laminated glass according to claim 1, containing a thermoplastic resin.

9. The interlayer film for laminated glass according to claim 1, further containing a plasticizer.

10. The interlayer film for laminated glass according to claim 1, comprising:
a first layer; and
a second layer arranged on a first surface side of the first layer.

11. The interlayer film for laminated glass according to claim 10, wherein the first layer contains a polyvinyl acetal resin,
the second layer contains a polyvinyl acetal resin, and
the content of the hydroxyl group of the polyvinyl acetal resin in the first layer is lower than the content of the hydroxyl group of the polyvinyl acetal resin in the second layer.

12. The interlayer film for laminated glass according to claim 10, wherein the first layer contains a polyvinyl acetal resin,
the second layer contains a polyvinyl acetal resin,
the first layer contains a plasticizer,
the second layer contains a plasticizer, and
the content of the plasticizer in the first layer relative to 100 parts by weight of the polyvinyl acetal resin in the first layer is larger than the content of the plasticizer in the second layer relative to 100 parts by weight of the polyvinyl acetal resin in the second layer.

13. The interlayer film for laminated glass according to claim 1, wherein the interlayer film is wound and formed into a roll body.

14. The interlayer film for laminated glass according to claim 13, wherein a radial directional inside interlayer film portion and a radial directional outside interlayer film portion are in contact with each other.

15. The interlayer film for laminated glass according to claim 10, further comprising a phenol-based oxidation inhibitor.

16. The interlayer film for laminated glass according to claim 10, further comprising a metal oxide.

17. The interlayer film for laminated glass according to claim 16, wherein
the metal oxide comprises tungsten oxide particles,
the tungsten oxide particles comprise at least one selected from the group consisting of sodium-doped tungsten oxide particles, cesium-doped tungsten oxide particles, thallium-doped tungsten oxide particles, and rubidium-doped tungsten oxide particles, and
a content of the tungsten oxide particles in the interlayer film is 0.01% by weight or more and 6% by weight or less.

18. A roll body, comprising:
a winding core; and
the interlayer film for laminated glass according to claim 1,
the interlayer film for laminated glass being wound around an outer periphery of the winding core.

19. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

* * * * *